(12) United States Patent
Zalewski

(10) Patent No.: US 7,657,879 B1
(45) Date of Patent: Feb. 2, 2010

(54) SYSTEM AND METHOD FOR CROSS-PLATFORM QUALITY CONTROL

(75) Inventor: Gary M. Zalewski, Oakland, CA (US)

(73) Assignee: Sony Computer Entertainment America Inc., Foster City, CA (US)

(*) Notice: Subject to any disclaimer, the term of this patent is extended or adjusted under 35 U.S.C. 154(b) by 0 days.

(21) Appl. No.: 12/341,212

(22) Filed: Dec. 22, 2008

Related U.S. Application Data

(60) Provisional application No. 61/061,552, filed on Jun. 13, 2008.

(51) Int. Cl.
G06F 9/45 (2006.01)
(52) U.S. Cl. ...................................................... 717/147
(58) Field of Classification Search ................. 717/147, 717/100
See application file for complete search history.

(56) References Cited

U.S. PATENT DOCUMENTS

| | | | | |
|---|---|---|---|---|
| 5,680,619 A * | 10/1997 | Gudmundson et al. | ...... | 717/108 |
| 5,960,196 A | 9/1999 | Carrier, III et al. | | |
| 6,044,335 A * | 3/2000 | Ksendzov | ................... | 702/182 |
| 6,782,421 B1 | 8/2004 | Soles | | |
| 7,076,475 B2 * | 7/2006 | Honarvar | ..................... | 706/47 |
| 7,188,331 B2 * | 3/2007 | Culter | ........................ | 717/100 |
| 7,305,431 B2 | 12/2007 | Karnik | | |
| 2001/0044339 A1 * | 11/2001 | Cordero et al. | ............... | 463/42 |
| 2004/0123306 A1 * | 6/2004 | Gazda et al. | ................. | 719/328 |
| 2004/0216125 A1 * | 10/2004 | Gazda et al. | ................. | 719/310 |
| 2006/0195748 A1 | 8/2006 | Chen et al. | | |
| 2007/0078002 A1 * | 4/2007 | Evans et al. | ................... | 463/43 |
| 2008/0010293 A1 | 1/2008 | Zpevak | | |
| 2008/0046266 A1 | 2/2008 | Gudipalley et al. | | |
| 2008/0102947 A1 * | 5/2008 | Hays et al. | ..................... | 463/31 |
| 2008/0119286 A1 * | 5/2008 | Brunstetter et al. | ........... | 463/43 |
| 2008/0208667 A1 | 8/2008 | Lymbery | | |

OTHER PUBLICATIONS

Jamieson et al. "A Metric Evaluation of Game Application software", Oct. 13-15, 2005, Submitted to The Furture Play Conference, Michigan State university MI, pp. 1-8.*
Carrington et al. "How Well Can Simple Metrics Represent the Performance of HPC Applications?", Nov. 2005, IEEE computer Society, 13 pages.*
Jeremey Reimer, "Cross-Platform Game Development and the Next Generation of Consoles," Nov. 7, 2005, Ars Technica LLC., 2 pages.
Valeria Cardellini et al., "Efficient Provisioning of Service Level Agreements for Service Oriented Applications," Dipartimento di Informatica, Sistemi e Produzione, University of Roma, IW-SOSWE '07, Sep. 3, 2007, Dubrovnik Croatiia, pp. 29-35.
Jari Raman, "Contracting over the Quality Aspect of Security in Software Products Markets," Institute for Law and Informatics, University of Lapland, QoP '06, Oct. 30, 2006, Alexandria, Virginia, pp. 19-25.

* cited by examiner

*Primary Examiner*—Anna Deng
(74) *Attorney, Agent, or Firm*—Carr & Ferrell LLP

(57) ABSTRACT

Assurance of quality with respect to of a software application across different operating platforms with different system architectures is provided. Methods for determining and assuring said quality as well as a system for the same is disclosed. A method for ensuring compliance with a contractual obligation related to quality of service in software is also disclosed.

9 Claims, 3 Drawing Sheets

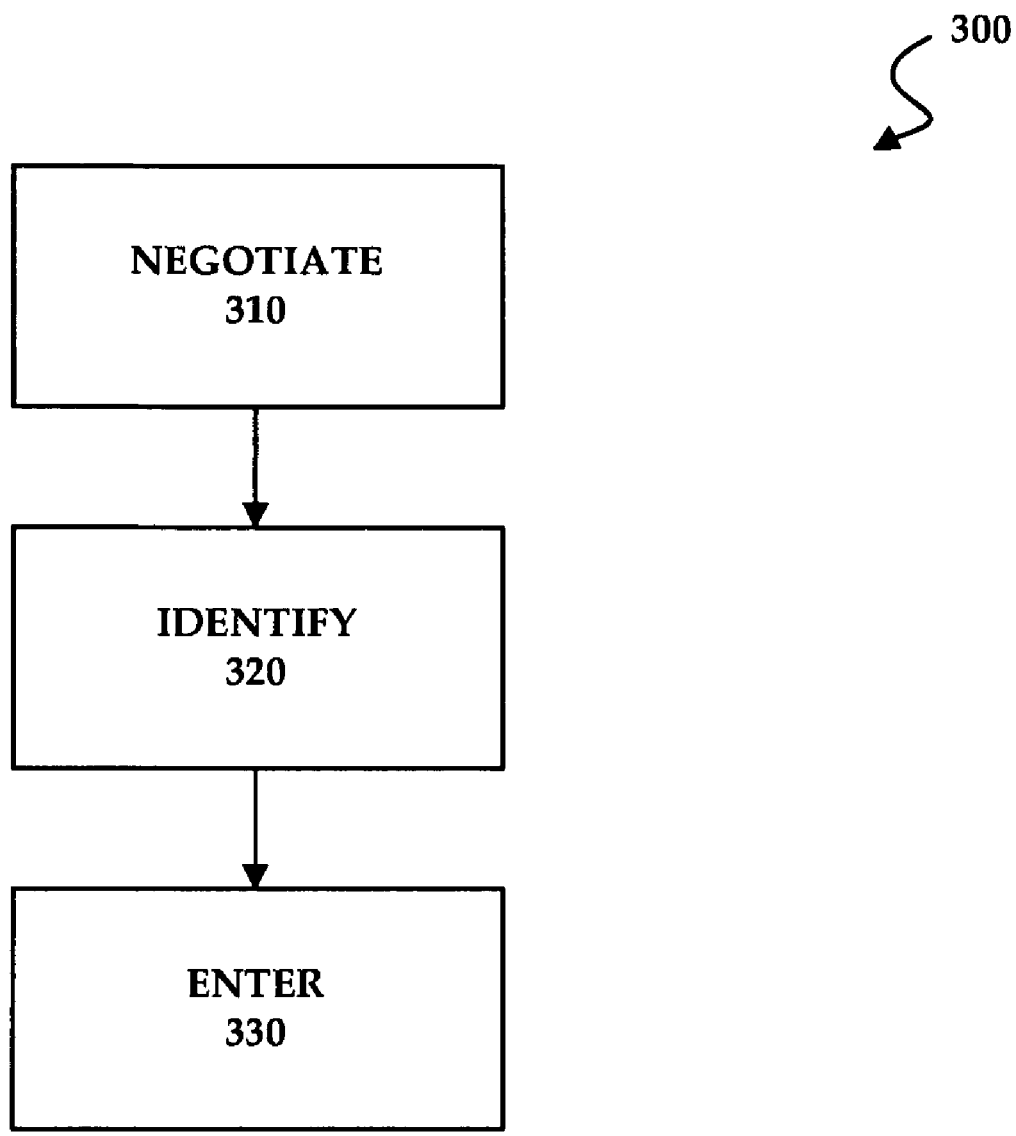

SYSTEM AND METHOD FOR CROSS-PLATFORM QUALITY CONTROL

CROSS-REFERENCE TO RELATED APPLICATIONS

The present application claims the priority benefit of U.S. provisional patent application No. 61/061,552 filed Jun. 13, 2008 and entitled "Ensuring Contractual Compliance in Cross-Platform Quality Control." This application is also related to U.S. patent application Ser. No. 12/341,187 filed Dec. 22, 2008 and entitled "Method for Ensuring Contractual Compliance in Cross-Platform Quality Control."

BACKGROUND

1. Field of the Invention

The present invention generally relates to software quality. More specifically, the present invention concerns ensuring quality of a software application across a number of different operating platforms with different system architectures.

2. Description of the Related Art

Historically, software applications were authored exclusively for a single hardware platform or operating environment. For example, a word processing application might have been authored exclusively for a personal computer running a Windows® operating system (OS). Similarly, an Internet-based music store application might have been authored exclusively for a Macintosh computer running a Mac® OS.

Video games were no different as many game titles were exclusive to a particular gaming platform. In some instances, video games were authored by the manufacturer of the gaming platform. In other instances, however, video game designers and publishers were contractually obligated to exclusively provide a particular game title to a single manufacturer and their particular game platform.

As the variety of gaming platforms has increased and the total number of platforms in the hands of consumers has proliferated, there has been an increased demand for content (i.e., software applications such as video games). While hardware manufacturers continue to produce certain exclusive game titles, the majority of software application development and video game design has become the realm of independent game studios such as Rockstar Games and Vivendi Games. The increased demand for content by the consumer marketplace—which includes multiple game platforms—as well as the increased quality of video games has allowed game studios to wield increased negotiating clout. As such, it has become increasingly common for a single game author to develop their game for multiple gaming platforms as cross-platform availability is demanded by the consumer. Hardware manufacturers have been forced to comply with this increased negotiating power of game designers in order to ensure they have the most desired game titles available for their particular platform.

All the while, competition between platform manufacturers remains intense. Despite the fact that certain platforms (such as the PlayStation® 3 from Sony Computer Entertainment Inc.) are technically superior in almost every way to those of their competitors (such as the Microsoft® X-Box), software applications such as video games are increasingly without a native hardware platform or operating environment. Game designers increasingly provide the same title and 'port' it across multiple platforms instead of writing the game in an optimized way for the specific architecture of a particular platform. As such, a game title may perform better on one platform versus another due to the particularities of how the title was authored.

With competition remaining intense, there is a need in the art to ensure that a common game title meets or exceeds quality metrics on one platform versus a competing platform.

SUMMARY OF THE INVENTION

An embodiment of the presently claimed invention includes a method for ensuring quality of a software title implemented on a first platform where the software title has been developed for multiple platforms. Through the method, a metric associated with the software title is established. The metric associated with the software title on the first platform is measured. The metric associated with the software title on a second platform is measured. The second platform has different system architecture from that of the first platform. Responsive action is then taken based on results of the measurement of the metric on the first platform versus results of the measurement of the metric on the second platform.

A further embodiment of the presently claimed invention is for a system that ensures quality of a software title implemented on a plurality of platforms where the software title having been developed for multiple platforms. The system includes a first platform and a second platform, the second platform having different system architecture from that of the first platform. A controller is configured to generate input recognized by the software title on the first platform and the software title on the second platform. An analysis module measures a metric associated with the software title on both the first and second platform. Responsive action may be taken based on results generated from the measurement of the metric on the first platform versus the second platform.

BRIEF DESCRIPTION OF THE DRAWINGS

FIG. 3 illustrates an exemplary method for ensuring compliance with a contractual obligation related to quality of service in software development for a first platform.

DETAILED DESCRIPTION

Figure 1:
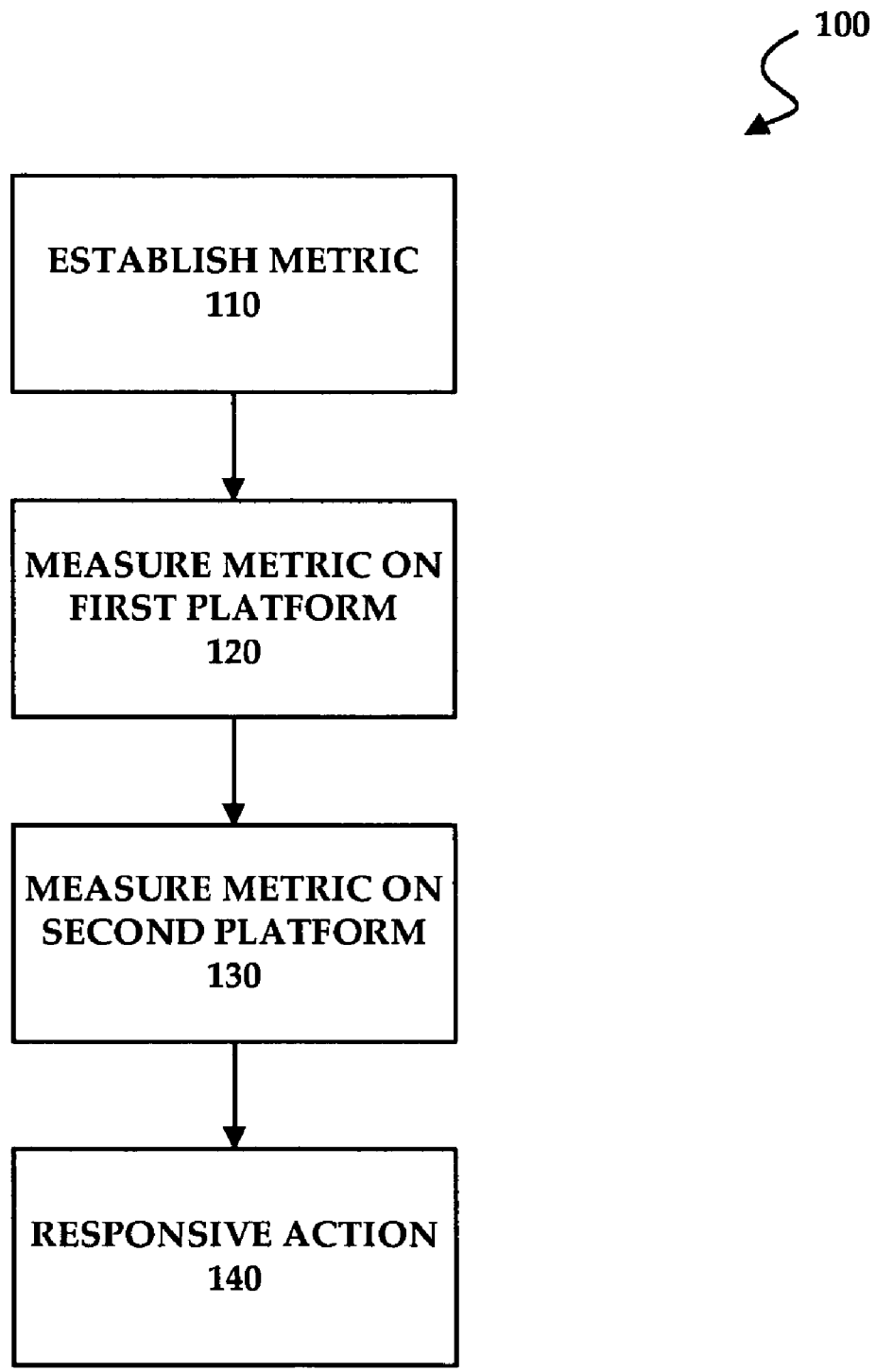
FIG. 1 illustrates an exemplary method for ensuring quality of a software title developed for multiple platforms.

FIG. 1 illustrates a method 100 for ensuring quality of a software title developed for multiple platforms. In step 110, a metric is established. The metric of step 110 is associated with the software title.

The metric of step 110 may include video analysis. For example, video analysis may include a determination made with respect to video quality. The video analysis may also pertain to determinations made with respect to video conferencing between users in a communication network and latency between conferees. Video analysis determinations may also involve latency between an audio stream associated with the analyzed video.

Video analysis metrics are also inclusive of determinations made with respect to average frame rate, signal-to-noise ratio (SNR), and peak signal-to-noise ratio (PNSR). Metrics may also be selected for the purpose of video analysis with respect to UQI, VQM, PEVQ, SSIM and CZD. A correlation coefficient may also be involved in video analysis. This correlation coefficient may be selected from the likes of linear correlation coefficient, Spearman's rank correlation coefficient, Kurtosis, Kappa coefficient and Outliers Ratio.

The metric involved in step 110 may also or alternatively involve audio analysis. The audio analysis may include a determination made with respect to sampling rate. Audio analysis is also inclusive of a determination made with respect to a range of sampled sound. Audio analysis may, too, include a determination made with respect to conversions in a sound production unit. Audio analysis may, in some instances, involve a determination made with respect to an ITU R468 weighting curve.

Like the metrics associated with video analysis, certain audio-oriented determinations may be made in the context of a conferencing environment. For example, audio analysis may include a determination made with respect to latency in an audio conference environment between users in a communication network. Certain audio-based analyses may be made with respect to a video stream associated with the analyzed audio.

Metrics utilized in step 110 of FIG. 1 may also include controller input. For example, a metric may be measure with respect to latency between the controller input and execution of an event responsive to the controller input. Controller input may be generally by a manually manipulated interface device. Controller input may also be artificially generated such that signals representative or real-world interface are generated for testing but actual manipulation of a tangible input device does not occur. In the case of the former, controller input may be generated by visual tracking, audio tracking, or displacement of an object in three-dimensional space. Representative signals of such input may also be artificially generated.

Quality of service metrics may also include a required number of cycles to execute a portion of a software application corresponding to the software title. Quality of service may also be related to communication networks. For example, the quality of service may be related to determinations made with respect to bit rate and network delay. With respect to network delay, the delay analysis may be inclusive of a processing delay, queuing delay, transmission delay, or propagation delay. Network quality of service determinations may also be made with respect packet delay variation, packet dropping probability, and bit error rate.

Means for testing these various metrics may take place utilizing techniques, equipment, or other methodologies that are known to those of skill in the art. These various means may be incorporated into a system for quality of service assurance like that illustrated and described in FIG. 2. Testing may also take place utilizing various facilities or analysis centers with the collective output being aggregated and analyzed at another locale. Testing may be automated and take place through a computing device. Testing may also be manual and relate to human perception. Testing may further weight and holistically consider the results of the two—both automated and manual testing. Acts related to analysis and reporting may likewise be automated and/or manual.

Testing, measurement, and other associated activities take place in step 120 as illustrated in FIG. 1 with respect, specifically, to a first platform. Similar (or identical testing) takes place in step 130 with respect to a second platform as illustrated in FIG. 1. The second platform (as involved in measurement step 130) has different system architecture than that of the first platform (measured in step 120). The differences may apply to the platform as a whole (e.g., overall system design) or with respect to particular elements of the system (e.g., graphics processors, central processing units, or sound processing units). For example, while the PlayStation®3 from Sony Computer Entertainment Inc. and Microsoft® X-Box are both gaming platforms, the design of the PlayStation® differs from that of the X-Box. This difference in system architecture and components related to the same, in part, explains the overall superiority of the former versus the latter.

The nature of these differences may vary with respect to a particular metric or metrics. For example, the measured metric may not be affected by the system architecture of the second platform with respect to the measured metric on the first platform. Alternatively, the measured metric may be adversely affected by the system architecture of the second platform with respect to the measured metric on the first platform. The measured metric may also be positively affected by the system architecture of the second platform with respect to the measured metric of the first platform. The metric as measured on the first platform may not be the same and may fail to exceed the metric as measured on the second platform. The metric as measured on the first platform may be the same or exceeds the metric as measured on the second platform.

In step 140 of FIG. 1, responsive action takes place. This responsive action may be based on results of the measurement of the metric on the first platform versus results of the measurement of the metric on the second platform. The responsive action may be a financial transaction related to development of the software title for the first platform. The financial transaction may be a payment conditioned upon the software title being the same or exceeding the metric as measured on the second platform. The responsive action may be a business incentive related to development of the software title for the first platform. The business incentive may be termination of a contract for future development of a software title for the first platform. The business incentive may be acceptance of a contract for future development of a software title for the first platform. The business incentive may be an exclusivity agreement for future development of a software title for the first platform. The financial transaction may be a forfeiture of funds previously paid to a software developer for development of the software title. The financial transaction may be a monetary penalty imposed against a software developer for failure to meet a standard of quality as established by a manufacturer of the first platform, the standard of quality corresponding to the metric. The monetary penalty may correspond to a degree of which the standard of quality failed to correspond to the metric.

Figure 2:
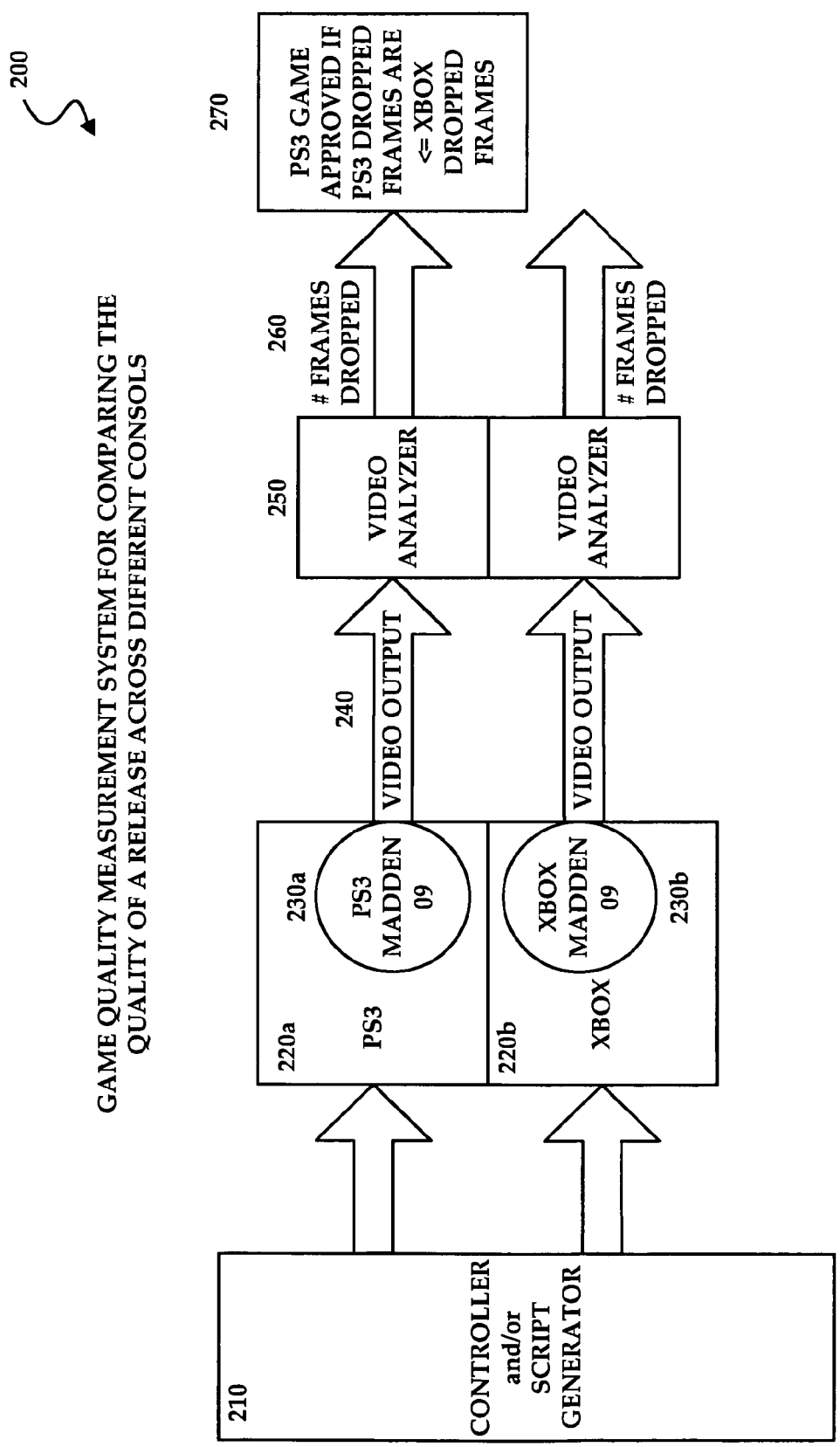
FIG. 2 illustrates an exemplary system for ensuring quality of a software title developed for multiple platforms.

FIG. 2 illustrates an exemplary system 200 for ensuring quality of a software title developed for multiple platforms. The system 200 of FIG. 2 includes a controller input or script generator 210, differing system platforms 220a and 220b, software title 230a and 230b as authored or ported for each of the aforementioned platforms (220a and 220b). System 200 further includes testing or analysis equipment 250, which may include automated software analysis.

Through system 200, the quality of a software title implemented on multiple platforms may be ensured. A first platform 220a and a second platform 220b have differing system architectures. A controller (as may be manipulated by a user) or script generator 210 (as may be found in a computing device) generates input recognized by the software title on the first platform 220a and second platform 220b. A software module (for example) at analysis equipment 250 measures a metric associated with the software title on both the first and second platform. Responsive action may be taken based on results generated from the measurement of the metric on the first platform versus the second platform.

The measured metric may not be affected by the system architecture of the second platform with respect to the measured metric on the first platform. The measured metric may be adversely affected by the system architecture of the second platform with respect to the measured metric on the first platform. The measured metric may be positively affected by the system architecture of the second platform with respect to the measured metric of the first platform. The first platform and the second platform may be emulated hardware environments or actual physical hardware components.

Controller input or script generator 210 may generate signal input corresponding to particular actions in a game. These actions may relate to effectuating a particular video or audio sequence (e.g., causing action in a game such that a particular scene is displayed) or be related solely to controller input to the extent that controller response is the testing metric (e.g., reaction to three-dimensional displacement of the controller in space). Input may be actual input generated by a controller as may occur through a person or automated piece of equipment causing manipulation of the control and/or actuation of certain button. The input may be scripted such that signals representative of actual manipulation of the control are generated notwithstanding the fact that the control itself has not been manipulated and may not even be presented. Input signals and/or scripts may be unique to a particular platform or may be generic. The controller/script generator 210 need not produce identical input (i.e., syntax) recognizable to both systems but input that corresponds to an identical or similar action in response to control manipulation (i.e., semantics).

Platforms 220a and 220b are game play or computing platforms with differing system architectures. Differences may encompass the system as a whole or be specific as to certain components such as a graphics processor or central processing unit. An example of differing platforms includes the PlayStation® 3 from Sony Computer Entertainment Inc. (220a) and the X-Box from Microsoft® Corporation (220b). The platforms may be an emulated hardware environment such that the actual gaming consoles are not present in the system. Instead, the platforms may be simulated through software and other drivers.

Software titles 230a and 230b are the games or other software applications that may be individually authored for each system or designed with a focus for one system and then ported to another system, which may include lack of functionality. In FIG. 2, the software title is Madden Football 2009. It should be noted that the exact same disc or computer readable storage medium is not used on both platforms as the disc would likely be non-functional. Reference to the 'same' software title is a game or other software application that is then played or executed on each system through its own system-specific computer readable medium or software coding/authoring.

Game output 240 is then taken from each system for testing. In FIG. 2, game output 240 is video output, which may be analyzed for one or more of the characteristics addressed in the context of FIG. 1 above. Testing equipment 250 then analyzes the output 240 from each system. Testing equipment may be platform specific but otherwise balanced with respect to a testing metric (i.e., the analysis equipment has been calibrated such that a certain quality of output on one platform has an equivalent quality on a competing platform). Analysis equipment 250 may be automated in the form of software such as a video analyzer in FIG. 2. Analysis equipment may also involve any number of hardware components or other testing elements.

In some embodiments of the present invention, analysis may take place using human observation. In such an embodiment, a human being may provide feedback as to which video selection 'looks better' from the two tested platforms. Similarly with respect to audio output and what 'sounds better.' A human user may also be used to test platform reaction to control input such that the use may communication how well a controller responds with respect to corresponding in-game activity. The user performing the analysis may be the same user providing the input in certain embodiments. Analysis may involve a combination of human observation and automated feedback/analysis.

Analysis output 260, which is frames dropped in FIG. 2, is then output after being passed through the testing and analysis equipment 250. Testing results may be automated and reduced to report form. Testing results (analysis output 260) may also be human feedback. An entity (270) then produces a report, which may be used to take responsive action to the testing results. Various types of responsive action have been discussed in the context of FIG. 1.

FIG. 3 illustrates an exemplary method 300 for ensuring compliance with a contractual obligation related to quality of service in software development for a first platform. In step 310, a contractual obligation is negotiated between a software developer and a platform provider. For example, Electronic Arts (a software developer) may negotiate with Sony Computer Entertainment Inc. (a platform provider) as to providing a particular software application (e.g., a video game) for operation on the PlayStation® 3 gaming console (i.e., the platform). Negotiations need not take place face-to-face nor need they take place directly through an authorized representative of either entity. Various intermediate proxies and negotiating techniques may be utilized with respect to formulating and executing a contractual agreement. The contract may encompass additional particularities of software development (e.g., deliverable time tables, marketing and promotion, and remuneration). The agreement may be specific to a particular software title, family of titles, or genre or catalog of applications and games to be provided for the platform.

Notwithstanding the negotiation of the agreement, the software developer may be permitted to enter into similar agreements with other platform providers. The software developer, in some instances, may have already entered into an agreement with another platform provider to provide the same game title. The other platform providers may offer a platform that has a system architecture that is distinct versus that of the party negotiating the current agreement. In some instances, these other platform providers may be direct competitors of the platform provider presently negotiating the contract. In that regard, the contract may not encompass exclusivity as to a particular platform. Some contracts may, however, provide for an initial period of exclusivity that expires after some period of time once the title has been released for purchase.

As a part of the negotiations, a quality of service metric is identified in step 320 of FIG. 3. This quality of service metric may be inclusive of any one or more of the metrics identified above. The identification of this metric and means for assuring compliance with the same may occur through various contractual drafting techniques as are known to those of skill in the art. The contract may include a provision that prohibits the quality of service for the identified metric from being less on the present platform than any other platform for which a contract has been or might be negotiated. In this way, the platform provider ensures that no other platform provider or competitor may offer the software title such that it performs better for any given metric or metrics on their particular platform. The metric may also be presented in the negative such that the measurement of the quality of service metric does not reveal a lesser performance on the platform presently being negotiated versus measurement of that same metric on any other platform.

In step 330 of FIG. 3, the contract is executed and the software provider and platform provider 'enter into' the contract for development of the software title on the platform of the platform provider. Following execution of the contract, periodic testing may take place by either the software provider or the platform provider to ensure compliance with the quality of service metric obligations. Testing may take place by the software provider, the platform provider, or an independent third-party. Depending on the results of the testing, certain responsive action may take place, which may be set forth in the terms of the contact. Examples of responsive action are addressed in the contact of FIG. 1. Responsive action may be related to the failure of the software provider to comply with the quality of service metric (e.g., another platform exhibits better performance for a given metric) or for exceeding the requirements of the metric. Responsive action, in this regard, may be retributive or a reward.

Certain of the aforementioned methodologies may be executed by a processor at a computing device. The computing device may execute these methodologies through the processing of a computer program embodied in a computer-readable storage medium. The storage medium is inclusive of media such as a CD, memory, floppy disk, flash memory, and hard drive.

While the present invention has been described in connection with a series of embodiments, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for ensuring quality of a software title implemented on a first platform, the software title having been developed for a plurality of platforms, the method comprising:
   establishing a metric associated with the software title, the established metric being stored in memory; and
   executing instructions stored in memory, wherein execution of the instructions by a processor:
      measures the metric pertaining to performance of a first hardware environment of the first platform during play of the software title, the first platform having a first system architecture including the first hardware environment,
      measures the metric pertaining to performance of a second hardware environment of a second platform from the plurality of platforms, the second platform having a system architecture including the second hardware environment that is different from the first hardware environment of the first platform, wherein the measured metric pertaining to performance of the second platform is adversely affected by the hardware environment of the second platform with respect to the measured metric pertaining to performance of the first hardware environment of the first platform,
      analyzes one or more characteristics based on results of the measurement of the metric pertaining to the first platform versus results of the measurement of the metric pertaining to the second platform,
      automatically generates a measurement result report from the analysis, and
      displays the measurement results report; and
   takes responsive action based on the measurement results report, wherein responsive action including a financial transaction is taken based on the displayed measurement results report.

2. The method of claim 1, wherein the metric as measured on the first platform is not the same and fails to exceed the metric as measured on the second platform.

3. The method of claim 1, wherein the metric as measured on the first platform is the same or exceeds the metric as measured on the second platform.

4. A system for ensuring quality of a software title implemented on a plurality of platforms, the software title having been developed for the plurality of platforms, the system comprising:
   a first platform from the plurality of platforms, the first platform having a first system architecture including a first hardware environment;
   a second platform from the plurality of platforms, the second platform having a second system architecture including a second hardware environment different from the hardware environment of the first platform;
   a controller configured to generate input recognized by the software title on the first platform and by the software title on the second platform; and
   an analysis module stored in memory and executable by a processor to
      measure a metric pertaining to performance of the first hardware environment and the second hardware environment in response to the controller during play of the software title on both the first and second platform, wherein the measured metric pertaining to performance of the second platform is adversely affected by the hardware environment of the second platform with respect to the measured metric pertaining to performance of the first hardware environment of the first platform,
      analyze one or more characteristics based on results of the measurement of the metric pertaining to the first platform versus results of the measurement of the metric pertaining to the second platform, and
      automatically generate a measurement results report from the analysis,
      display the measurement results report; and
      take a responsive action including a financial transaction is based on measurement results report generated from the measurement of the metric on the first platform versus the second platform.

5. The system of claim 4, wherein the hardware environments of the first platform and of the second platform are emulated hardware environments or physical hardware components.

6. A method for ensuring quality of a software title implemented on a first platform, the software title having been developed for a plurality of platforms, the method comprising:
   establishing a metric associated with the software title, the established metric being stored in memory; and
   executing instructions stored in memory, wherein execution of the instructions by a processor:
      measures the metric pertaining to performance of a first hardware environment of the first platform during play of the software title, the first platform having a first system architecture including the first hardware environment,
      measures the metric pertaining to performance of a second hardware environment of a second platform from the plurality of platforms, the second platform having a system architecture including the second hardware environment that is different from the first hardware environment of the first platform, wherein the measured metric pertaining to performance of the second platform is not affected by the hardware environment of the second platform with respect to the measured metric pertaining to performance of the first hardware environment of the first platform, analyzes one or more characteristics based on results of the measurement of the metric pertaining to the first platform versus results of the measurement of the metric pertaining to the second platform, automatically generates a measurement results report from the analysis, displays the measurement results report; and takes responsive action including a financial transaction based on the displayed results.

7. A method for ensuring quality of a software title implemented on a first platform, the software title having been developed for a plurality of platforms, the method comprising:

establishing a metric associated with the software title, the established metric being stored in memory; and executing instructions stored in memory, wherein execution of the instructions by a processor:

measures the metric pertaining to performance of a first hardware environment of the first platform during play of the software title, the first platform having a first system architecture including the first hardware environment, measures the metric pertaining to performance of a second hardware environment of a second platform from the plurality of platforms, the second platform having a system architecture including the second hardware environment that is different from the first hardware environment of the first platform, wherein the measured metric pertaining to performance of the second platform is positively affected by the hardware environment of the second platform with respect to the measured metric pertaining to performance of the first hardware environment of the first platform, analyzes one or more characteristics based on results of the measurement of the metric pertaining to the first platform versus results of the measurement of the metric pertaining to the second platform, automatically generates a measurement results report from the analysis, displays the measurement results report; and takes responsive action including a financial transaction based on the displayed results.

8. A system for ensuring quality of a software title implemented on a plurality of platforms, the software title having been developed for the plurality of platforms, the system comprising:

a first platform from the plurality of platforms, the first platform having a first system architecture including a first hardware environment;

a second platform from the plurality of platforms, the second platform having a second system architecture including a second hardware environment different from the hardware environment of the first platform;

a controller configured to generate input recognized by the software title on the first platform and by the software title on the second platform; and an analysis module stored in memory and executable by a processor to measure a metric pertaining to performance of the first hardware environment and the second hardware environment in response to the controller during play of the software title on both the first and second platform, wherein the measured metric pertaining to performance of the second platform is not affected by the hardware environment of the second platform with respect to the measured metric pertaining to performance of the first hardware environment of the first platform, analyze one or more characteristics based on results of the measurement of the metric pertaining to the first platform versus results of the measurement of the metric pertaining to the second platform, automatically generate a measurement results report from the analysis, display the measurement results report; and take responsive action including a financial transaction based on the displayed results.

9. A system for ensuring quality of a software title implemented on a plurality of platforms, the software title having been developed for the plurality of platforms, the system comprising:

a first platform from the plurality of platforms, the first platform having a first system architecture including a first hardware environment;

a second platform from the plurality of platforms, the second platform having a second system architecture including a second hardware environment different from the hardware environment of the first platform;

a controller configured to generate input recognized by the software title on the first platform and by the software title on the second platform; and an analysis module stored in memory and executable by a processor to measure a metric pertaining to performance of the first hardware environment and the second hardware environment in response to the controller during play of the software title on both the first and second platform, wherein the measured metric pertaining to performance of the second platform is positively affected by the hardware environment of the second platform with respect to the measured metric pertaining to performance of the first hardware environment of the first platform, analyze one or more characteristics based on results of the measurement of the metric pertaining to the first platform versus results of the measurement of the metric pertaining to the second platform, automatically generate a measurement results report from the analysis, display the measurement results report; and take responsive action including a financial transaction based on the displayed results.

* * * * *